United States Patent
Schmidt et al.

(10) Patent No.: US 7,777,992 B2
(45) Date of Patent: Aug. 17, 2010

(54) MOTOR START CIRCUIT

(75) Inventors: Claus Schmidt, Odense (DK); Hans Peter Kristensen, Aabenraa (DK)

(73) Assignee: Danfoss Compressors GmbH, Flensburg (DE)

( * ) Notice: Subject to any disclaimer, the term of this patent is extended or adjusted under 35 U.S.C. 154(b) by 0 days.

(21) Appl. No.: 11/935,731

(22) Filed: Nov. 6, 2007

(65) Prior Publication Data
US 2008/0225447 A1  Sep. 18, 2008

(30) Foreign Application Priority Data
Nov. 7, 2006 (DE) .................. 10 2006 053 524

(51) Int. Cl.
*H02H 5/04* (2006.01)
*H02H 7/08* (2006.01)

(52) U.S. Cl. .................. 361/25; 318/785; 318/786; 318/400.24; 361/23

(58) Field of Classification Search ............... 361/25, 361/23; 318/785, 786, 400.24
See application file for complete search history.

(56) References Cited

U.S. PATENT DOCUMENTS

| | | | |
|---|---|---|---|
| 3,562,587 A * | 2/1971 | Forst | 361/27 |
| 3,668,489 A | 6/1972 | Erdman | |
| 3,766,457 A | 10/1973 | Fink, Jr. et al. | |
| 3,792,324 A | 2/1974 | Suarez et al. | 318/221 |
| 3,803,866 A | 4/1974 | Barry | |
| 4,022,598 A * | 5/1977 | Gucwa et al. | 62/164 |
| 4,119,884 A * | 10/1978 | Blumenberg et al. | 313/417 |
| 4,366,426 A | 12/1982 | Turlej | 318/786 |
| 4,378,520 A | 3/1983 | Ford | |
| 4,455,521 A | 6/1984 | Day et al. | |
| 4,605,888 A | 8/1986 | Kim | 318/786 |

(Continued)

FOREIGN PATENT DOCUMENTS

CN  2412319 Y  12/2000

(Continued)

OTHER PUBLICATIONS

U.S. Appl. No. 11/776,246 entitled "Motor Start Circuit" filed Jul. 11, 2007 in the name of Schmidt et al.

(Continued)

*Primary Examiner*—Bentsu Ro
*Assistant Examiner*—Erick Glass
(74) *Attorney, Agent, or Firm*—McCormick, Paulding & Huber LLP

(57) ABSTRACT

Motor start circuit for an induction motor, particularly a single-phase AC induction motor, with a main winding (4) and an auxiliary winding (5), which are supplied with current, particularly alternating current, via current supply connections (24, 25), and with a start switching device (15) serving the purpose of interrupting the current flow through the auxiliary winding (5) after the start of the motor, the start switching device (15) being connected to a control device (20) via a connector (18), the control device (20) being connected between the current supply connections (24, 25), and with a winding protection switch (28), which is normally closed and which opens on the occurrence of a fault. The invention is characterized in that the control device (20) is connected to the winding protection switch (28) via at least one further connector (22, 17), preferably via at least one further connector (22, 17) and the auxiliary winding (5).

16 Claims, 1 Drawing Sheet

U.S. PATENT DOCUMENTS

| | | | |
|---|---|---|---|
| 4,674,021 A | 6/1987 | Sachs | 363/56 |
| 4,772,808 A * | 9/1988 | Vial | 307/125 |
| 4,782,278 A | 11/1988 | Bossi et al. | 318/786 |
| 4,786,850 A | 11/1988 | Chmiel | 318/786 |
| 4,820,964 A | 4/1989 | Kadah et al. | |
| 4,843,295 A | 6/1989 | Thompson et al. | 318/786 |
| 4,862,053 A | 8/1989 | Jordan et al. | 318/786 |
| 5,041,771 A | 8/1991 | Min | 318/786 |
| 5,051,681 A | 9/1991 | Schwarz | 318/786 |
| 5,103,154 A | 4/1992 | Dropps et al. | |
| 5,296,795 A | 3/1994 | Dropps et al. | 318/778 |
| 5,302,885 A | 4/1994 | Schwarz et al. | 318/781 |
| 5,345,126 A | 9/1994 | Bunch | |
| 5,488,834 A * | 2/1996 | Schwarz | 62/126 |
| 5,528,120 A | 6/1996 | Brodetsky | 318/785 |
| 5,808,441 A | 9/1998 | Nehring | 318/751 |
| 5,818,122 A | 10/1998 | Miyazawa et al. | 307/10.7 |
| 6,320,348 B1 | 11/2001 | Kadah | 318/785 |
| 6,982,539 B1 * | 1/2006 | Ward | 318/778 |
| 6,989,649 B2 | 1/2006 | Mehlhorn | |
| 2004/0263109 A1 | 12/2004 | Schwarz | 318/778 |
| 2005/0184699 A1 | 8/2005 | Unno | 318/786 |

FOREIGN PATENT DOCUMENTS

| | | |
|---|---|---|
| DE | 197 35 552 | 2/1999 |
| DE | 197 41 828 | 3/1999 |
| DE | 102 00 401 8966 | 12/2005 |
| EP | 0 294 118 A2 | 12/1988 |
| EP | 0 571 956 B1 | 12/1993 |
| EP | 0 356 310 B1 | 3/1994 |
| EP | 0 802 621 B1 | 10/1997 |
| EP | 0 924 735 A2 | 6/1999 |
| EP | 1 315 279 A2 | 5/2003 |
| EP | 1 494 346 A2 | 1/2005 |
| EP | 1 240 709 | 11/2005 |
| EP | 1 619 786 A2 | 1/2006 |
| JP | 58-107069 | 6/1983 |
| JP | 60-32583 | 2/1985 |
| JP | 10-225 156 | 8/1998 |
| WO | WO 99/09575 | 2/1999 |
| WO | WO 01/69147 A1 | 9/2001 |
| WO | 2006/001601 A1 | 1/2006 |

OTHER PUBLICATIONS

U.S. Appl. No. 11/740,329 entitled "Motor Start Circuit" filed Apr. 26, 2007 in the name fo Schmidt et al.

Chapter 17, Transient Suppressors and Surge Suppressors, pp. 17-1 to 17-17; Robust Electronic Design Reference Book, vol. I, vol. 2, Appendices.

Rachem Circuit Protection, Fundamentals, pp. 15-42.

"Overvoltage Crowbar Sensing Circuit"; Publication No. MC3423/D, Mar. 2005—Rev. 5, pp. 1, 3 and 4.

"Over Voltage Protection"; http:/www.mitedu.freeserve.co.uk/Design/overvoltage.htm; pp. 1-2; Aug. 10, 2005.

* cited by examiner

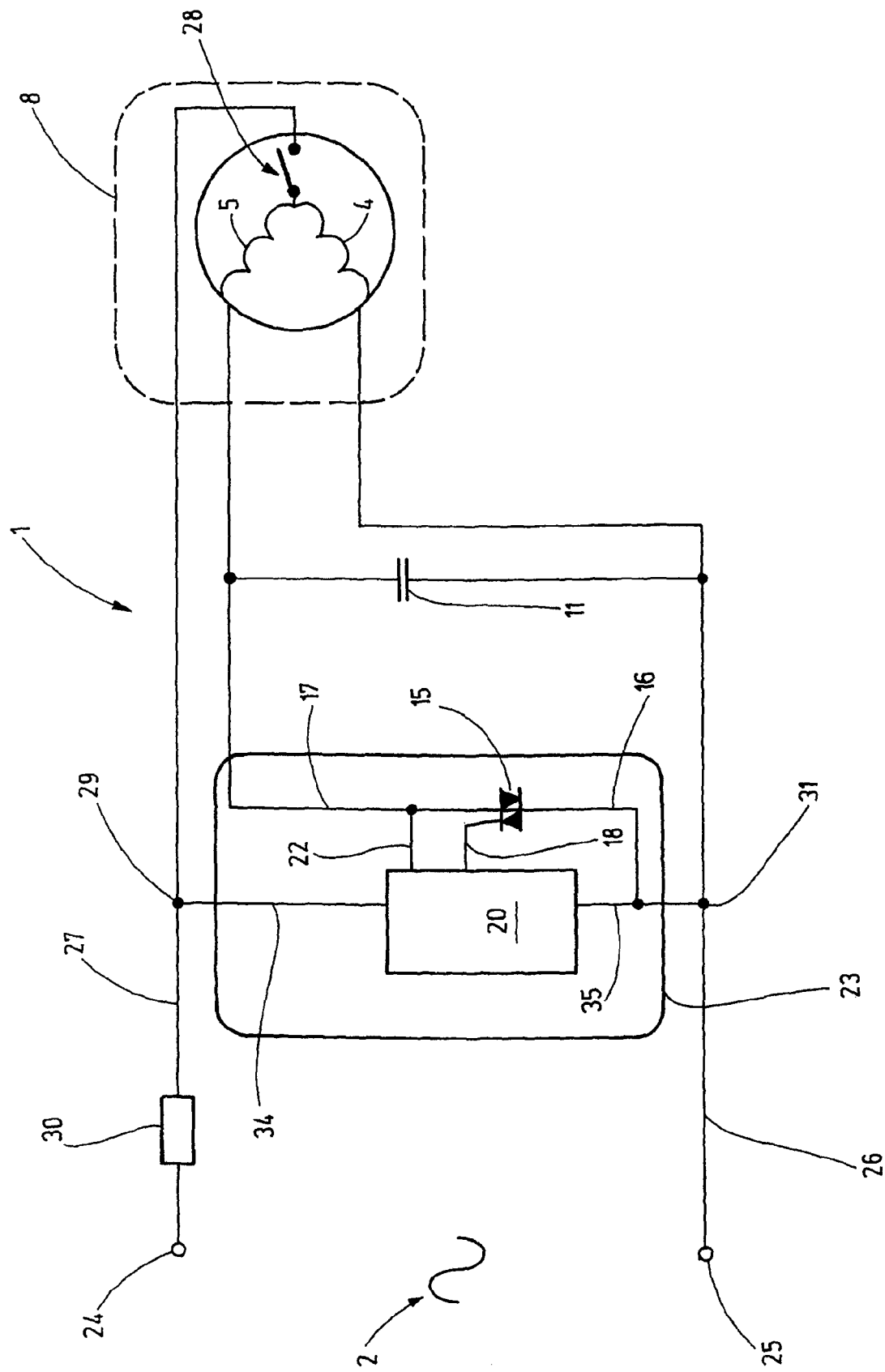

MOTOR START CIRCUIT

CROSS REFERENCE TO RELATED APPLICATIONS

Applicant hereby claims foreign priority benefits under U.S.C. §119 from German Patent Application No. 10 2006 053 524.3 filed on Nov. 7, 2006, the contents of which are incorporated by reference herein.

FIELD OF THE INVENTION

The invention concerns a motor start circuit for an induction motor, particularly a single phase AC induction motor, with a main winding and an auxiliary winding supplied with current, mainly AC, via current supply connections, and with a start device serving the purpose of stopping the current flow through the auxiliary winding after the start of the motor, and being connected via a conductor to a control device connected between the current supply connections, and with a winding protection switch, which is normally closed and opens on the occurrence a fault. The invention further concerns an induction motor, particularly a single phase AC induction motor. The invention further concerns a compressor. The invention further concerns a cooling and/or freezing device. The invention further concerns a circuit board. The invention further concerns a method of monitoring the state of a winding protection switch in a motor start circuit. The invention further concerns a method of starting an induction motor, in particular a single phase AC induction motor.

BACKGROUND OF THE INVENTION

Traditional motor start circuits are provided with a thermal breaker, also called thermal switch or winding protection switch. In induction motors for compressors for household appliances, the winding protection switch may be located in a hermetically closed compressor housing or motor housing. The thermal switch or winding protection switch is normally closed and serves the purpose of interrupting the current flow through the auxiliary winding and the main winding, if the rotor stops and the power exceeds a permissible maximum value or too much heat is produced in the winding itself.

SUMMARY OF THE INVENTION

It is the task of the invention to improve the lifetime of a motor start circuit in a simple manner.

With a motor start circuit for an induction motor, particularly a single phase AC induction motor, with a main winding and an auxiliary winding supplied with current, mainly AC, via current supply connections, and with a start device serving the purpose of stopping the current flow through the auxiliary winding after the start of the motor, and being connected via a conductor to a control device connected between the current supply connections, and with a winding protection switch, which is normally closed and opens on the occurrence a fault, the task is solved in that the control device is connected to the winding protection switch via at least one further conductor, preferably via at least one further conductor and the auxiliary winding. The main winding is also called run winding. The auxiliary winding is also called start winding. The additional connection between the control device and the winding protection switch makes it possible to sense the voltage over the winding protection switch. Thus, it is possible to monitor, if the start process of the induction process proceeds, or if the winding protection switch is open. If the winding protection switch is open, the start process can be interrupted, and, if required, a new start process can be initiated after the lapse of a predetermined period.

Preferably, at least one measuring device and at least one evaluation device are combined in the control device. The combined measuring, evaluation and control device can also be called a controller. This is, for example, an FPGA (Field Programmable Gate Array), an ASIC (Application Specific Integrated Circuit), a microprocessor or a microcontroller.

A preferred embodiment of the motor start circuit is characterised in that the control device is connected to the start device via a further conductor. Thus, by means of the control device, the voltage over the winding protection switch, particularly over the auxiliary winding and the winding protection switch, can be sensed. Secondly, the voltage between the current supply connections can be sensed by means of the control device. Further, the start device can be monitored by means of the control device. In particular, it can be monitored, if a control impulse of the start device is available, or if the control impulse is equal to zero.

Further preferred embodiments of the motor start circuit are characterised in that the fault comprises an overheating of at least one element of the motor start circuit and/or a blocking of a rotor of the induction motor.

The invention further concerns an induction motor, particularly a single-phase AC induction motor, with a previously described motor start circuit.

The invention further concerns a compressor with a previously described induction motor.

The invention further concerns a domestic appliance, particularly a refrigerator or a freezer with a previously described compressor.

The invention further concerns a circuit board with a previously described motor start circuit. The circuit board is a printed circuit board serving the purpose of carrying electronic components.

A preferred embodiment of the circuit board is characterised in that the circuit board comprises a programmable chip.

With a method for monitoring the state of the winding protection switch of a previously described motor start circuit, the task mentioned above is solved in that the voltage over the winding protection switch is sensed. This is a simple way of determining, if the starting of the motor is proceeding or if the winding protection switch is open.

A preferred embodiment of the method is characterised in that the voltage over the auxiliary winding and the winding protection switch can be sensed by means of the control device.

A further preferred embodiment of the method is characterised in that the voltage between the current supply connections can be sensed by means of the control device.

A further preferred embodiment of the method is characterised in that by means of the control device the start device is monitored, particularly that the control impulse of the start device is sensed.

A further preferred embodiment of the method is characterised in that the control device senses if a voltage in a conductor of the control device exceeds a predetermined value, if the start device is active and if the voltage over the auxiliary winding increases. If the voltage in the conductor of the control device exceeds the predetermined value, this is taken as a sign of the control device being active. The start device has been or will be turned on. If the voltage over the auxiliary winding does not increase, this is taken as a sign of the winding protection switch being open. If the winding protection switch were closed, the voltage over the auxiliary winding would increase.

With a method of starting an induction motor, particularly a single-phase AC induction motor, with a previously described motor start circuit, the state of the winding protection switch being monitored according to the previously described method, the previously stated task is solved in that the induction motor is not started, if the voltage in the conductor of the control device exceeds the predetermined value, the start device is active and the sensed voltage over the auxiliary winding does not increase. It these three conditions are all met, this is a sign that the winding protection switch is open. Then the start procedure is interrupted or a starting is not attempted. In practice this means that the start device receives no control impulse. As soon as the winding protection switch closes again, which is recognised by an increase of the voltage over the auxiliary winding, a new start attempt can be made.

A preferred embodiment of the method is characterised in that the start device is returned to its initial state after an interrupted start attempt of the induction motor. When it is established that the winding protection switch is open, the start attempt is interrupted. When the winding protection switch closes again, a new start attempt can be made.

A further preferred embodiment of the method is characterised in that the induction motor is started as soon as the sensed voltage, particularly a voltage increase, over the winding protection switch, particularly the auxiliary winding and the winding protection switch, approximately corresponds to the voltage, particularly the voltage increase, between the current supply connections. This is taken as a sign that the winding protection switch is closed again. In this case, a new start attempt can be made.

BRIEF DESCRIPTION OF THE DRAWINGS

FIGURE is a circuit diagram of a motor start circuit.

DETAILED DESCRIPTION OF THE PREFERRED EMBODIMENTS

Further advantages, characteristics and details of the invention appear from the following description, in which an embodiment is described in detail with reference to the drawing.

The enclosed FIGURE shows a circuit diagram of a motor start circuit 1. The motor start circuit 1 comprises the electrical and electronic components for starting and driving a single-phase AC induction motor, in the following referred to as motor. The motor comprises a main winding 4 and an auxiliary winding 5, which are located in a hermetically closed compressor housing that is shown as a dotted, square frame 8.

A run capacitor 11 is connected in series with the auxiliary winding 5. Further, a start switching device 15 is connected in series with the auxiliary winding 5. The start switching device 15 serves the purpose of interrupting a connection between a conductor 16 and a conductor 17. In the shown state, the connection between the conductors 16 and 17 is interrupted by the switching device 15. The conductor 17 connects the start switching device 15 and, in the closed state of the start switching device, the conductor 16 to the auxiliary winding 5.

In a manner known per se, single-phase AC induction motors comprise a stator and a rotor. A condition for the generation of a rotating field in the stator is a phase-shifting of the current in the auxiliary winding in relation to the current in the main winding. The alternating fields occurring in the main winding and the auxiliary winding are then offset in relation to each other in time and space and form a common rotating field. The rotating field causes a self-start of the motor. After the start or run-up of the motor the auxiliary winding 5 is turned off by the start switching device 15. After turning off the auxiliary winding 5, the motor works as an asynchronous motor.

Via a control conductor 18, the start switching device 15 is connected to a control device 20. The control device 20 is connected to the auxiliary winding 5 via a further conductor 22 and the conductor 17. Via the conductors 22 and 17, the voltage over the auxiliary winding 5 can be sensed by the control device 20.

A square frame 23 suggests that the control device 20 and the start switching device 15 are parts of a starter serving the purpose of starting the motor. The current supply of the motor start circuit 1 occurs by applying an alternating voltage 2 to two current supply connections 24 and 25. The current supply connection 25 is connected via a conductor 26 to the control device 20, the run capacitor 11 and the main winding 4. The current supply connection 24 is connected via a conductor 27 to the control device 20 and the two windings 4 and 5.

A winding protection switch 28 is connected in series with the two windings 4 and 5. During normal operation of the motor the winding protection switch 28 is closed. If, for example, the rotor is blocked, this may cause the power to exceed a permissible maximum value and/or that too much heat is produced. In such a case, the winding protection switch 28 opens to prevent damage to the windings 4 and 5.

Between the two current supply connections 24 and 25 and the motor two conductor branches 29 and 31 are provided, between which the control device 20 is connected. A protection fuse 30 is provided in the conductor 27 between the current supply connection 24 and the conductor branch 29. The protection fuse 30 serves the purpose of interrupting the current supply to the motor start circuit 1, if the start switching device 15 does not open correctly and remains permanently closed. In this case a fault current would permanently flow through the closed switching device 15 and the auxiliary winding 5. This permanent current supply could cause damage to the auxiliary winding 5 and/or the start switching device 15.

The winding protection switch 28 reacts too slowly and is not dimensioned to become active in the case of a malfunction of the start switching device 15. The protection fuse 30 ensures that the fault current caused by the malfunctioning start switching device 15 will only last a short while. The additional protection fuse 30 reacts faster than the winding protection switch 28 and ensures a fast interruption of the current flow in the case of a fault current.

The control device 20 is a combined measuring, evaluation and control device. Via conductors 34, 35 and the conductor branches 29, 31 the control device 20 firstly detects, if the current supply connections 24, 25 are supplied with current. Further, the control device 20 assumes the function of an evaluation device detecting the change of the voltage sensed over the auxiliary winding 5. Finally, the control device 20 has an active connection to the winding protection switch 28.

The winding protection switch 28 is activated by heat and indirectly also by the current flowing through it. The control device 20 can detect, if the winding protection switch 28 is open. This information can be used for different purposes. According to an essential aspect of the invention, this information is used to carry through a reset of the start switching device 15, so that the start switching device 15 can be started again.

By means of the control device 20 the voltage in the conductors 22 and 34 is detected. If this voltage exceeds the predetermined value, this means that the control device 20 is active. If the control device 20 is active, the start switching device 15 is switched on via the control conductor 18 by means of a suitable control impulse. If turning on the start switching device 15 does not make the voltage over the start or auxiliary winding 5 increase, it means that the winding protection switch 28 is open. If the winding protection switch 28 were closed, the voltage over the start winding 5 would increase.

If, by means of the control device 20, it is established that the winding protection switch 28 is open, a start attempt will not be permitted, meaning that the start switching device 15 receives no control signal. As soon as the winding protection switch closes again, a start attempt is permitted. The closing of the winding protection switch 28 is, for example, established in that the voltage in or at the conductor 17 increases similarly to the voltage at the conductor branch 29.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A motor start circuit for an induction motor, particularly a single-phase AC induction motor, with a main winding and an auxiliary winding, which are supplied with current, particularly alternating current, via current supply connections, and with a start switching device serving the purpose of interrupting the current flow through the auxiliary winding after the start of the motor, the start switching device being connected to a control device via a connector, the control device being connected between the current supply connections, and with a winding protection switch, which is normally closed and which opens on the occurrence of a fault, wherein the control device is connected to the winding protection switch via the auxiliary winding.

2. The motor start circuit according to claim 1, wherein the fault comprises the overheating of at least one element of the motor start circuit.

3. The motor start circuit according to claim 1, wherein fault comprises a blocking of a rotor of the induction motor.

4. A circuit board with a motor start circuit according to claim 1.

5. The circuit board according to claim 4, wherein the conductor plate comprises a programmable chip.

6. A method for starting an induction motor, particularly a single-phase AC induction motor, with a motor start circuit according to claim 1, the state of the winding protection switch being monitored wherein the induction motor is not started, if:
   the voltage in the conductor of the control device exceeds the predetermined value,
   the start switching device is active,
   the sensed voltage over the auxiliary winding, particularly in the conductors, does not increase.

7. The method according to claim 6, wherein after an interrupted start attempt of the induction motor the start switching device is returned to its initial state.

8. The method according to claim 6, wherein the induction motor is started, as soon as the sensed voltage, particularly a voltage increase, over the auxiliary winding and the winding protection switch approximately corresponds to the voltage, particularly a voltage increase, between the current supply connections.

9. An induction motor, particularly single-phase AC induction motor, with a motor start circuit with a main winding and an auxiliary winding, which are supplied with current, particularly alternating current, via current supply connections, and with a start switching device serving the purpose of interrupting the current flow through the auxiliary winding after the start of the motor, the start switching device being connected to a control device via a connector, the control device being connected between the current supply connections, and with a winding protection switch, which is normally closed and which opens on the occurrence of a fault, wherein the control device is connected to the winding protection switch via the auxiliary winding.

10. A compressor with an induction motor according to claim 9.

11. A refrigerator or freezer with a compressor according to claim 10.

12. A method for monitoring the state of the winding protection switch in a motor start circuit for an induction motor, particularly a single-phase AC induction motor, with a main winding and an auxiliary winding, which are supplied with current, particularly alternating current, via current supply connections, and with a start switching device serving the purpose of interrupting the current flow through the auxiliary winding after the start of the motor, the start switching device being connected to a control device via a connector, the control device being connected between the current supply connections, and with a winding protection switch, which is normally closed and which opens on the occurrence of a fault, wherein the control device is connected to the winding protection switch via the auxiliary winding, wherein the voltage over the winding protection switch is sensed.

13. The method according to claim 12, wherein the voltage over the auxiliary winding and the winding protection switch is sensed by means of the control device.

14. The method according to claim 12, wherein the voltage between the current supply connections is sensed by means of the control device.

15. The method according to claim 14, wherein by means of the control device the start switching device is monitored, in particular the control impulse of the start switching device is sensed.

16. The method according to claim 15, wherein the control device senses, if:
   the voltage in a conductor of the control device exceeds a predetermined value,
   the start switching device is active,
   the voltage over the auxiliary winding, particularly in the conductors, increases.

* * * * *